(12) United States Patent
Guldevall

(10) Patent No.: US 7,336,823 B2
(45) Date of Patent: Feb. 26, 2008

(54) METHOD AND APPARATUS FOR PROVIDING AN INFRARED IMAGE

(75) Inventor: Ulf Guldevall, Taby (SE)

(73) Assignee: Flir Systems AB, Danderyd (SE)

( * ) Notice: Subject to any disclaimer, the term of this patent is extended or adjusted under 35 U.S.C. 154(b) by 719 days.

(21) Appl. No.: 10/480,052

(22) PCT Filed: Jun. 13, 2002

(86) PCT No.: PCT/SE02/01144

§ 371 (c)(1),
(2), (4) Date: Dec. 9, 2003

(87) PCT Pub. No.: WO02/104010

PCT Pub. Date: Dec. 27, 2002

(65) Prior Publication Data

US 2004/0232333 A1    Nov. 25, 2004

(30) Foreign Application Priority Data

Jun. 18, 2001 (SE) .................................... 0102150

(51) Int. Cl.
*G06K 9/00* (2006.01)
*G06K 9/40* (2006.01)

(52) U.S. Cl. ....................... 382/169; 382/274
(58) Field of Classification Search ..................... None
See application file for complete search history.

(56) References Cited

U.S. PATENT DOCUMENTS

| 5,063,607 | A | | 11/1991 | Fitzhenry et al. | |
|---|---|---|---|---|---|
| 5,249,241 | A | * | 9/1993 | Silverman et al. | 382/169 |
| 5,416,711 | A | * | 5/1995 | Gran et al. | 701/117 |
| 5,555,324 | A | * | 9/1996 | Waxman et al. | 382/254 |
| 5,999,650 | A | * | 12/1999 | Ligon | 382/191 |
| 6,465,785 | B1 | * | 10/2002 | McManus | 250/338.1 |
| 6,591,021 | B1 | * | 7/2003 | Breiter et al. | 382/274 |
| 6,597,991 | B1 | * | 7/2003 | Meron et al. | 702/3 |
| 6,792,141 | B2 | * | 9/2004 | Huniu | 382/169 |

OTHER PUBLICATIONS

Patent Abstracts of Japan, vol. 1998, No. 11, Sep. 30, 1998 & JP 10 160581 A (Matsushita Electric Ind Co Ltd) Jun. 19, 1998 abstract.
Rockinger, O. "Image Sequence Using a Shift-Invariant Wavelet Transform", in: Proc. IEEE Intl. Conference on Image Processing, 1997., pp. III-288-291, see abstract.
Rockinger, O. et al. Pixex-Level Image Fusion:, The Case of Image Sequences. In: Proc. SPIE, 1998, vol. 3374, pp. 378-388, see abstract.

* cited by examiner

*Primary Examiner*—Wenpeng Chen
*Assistant Examiner*—Yuzhen Ge
(74) *Attorney, Agent, or Firm*—Young & Thompson

(57) ABSTRACT

A method and a device to provide a full representation of an object having a wide dynamic intensive range and maintain a good sensitivity for signal levels throughout the whole intensive range is disclosed. The wide intensive range is divided into a predetermined number of intensive intervals inside the wide intensive range. The intensive intervals are provided at the side of each other or are partly overlapping. The same number of interval representations of the object are provided as the predetermined number of intervals. Each interval representation is adapted to one individual of the intervals. The sizes, acquisition parameters and/or calibration parameters of the interval representations are adapted to each other. The interval representations are combined such that their respective intervals are provided in the same full representation.

17 Claims, 4 Drawing Sheets

METHOD AND APPARATUS FOR PROVIDING AN INFRARED IMAGE

This invention relates to a method and apparatus for providing an infrared (IR) image. The invention relates especially to a method and apparatus for making an infrared image having a wide dynamic temperature range.

BACKGROUND

It has until now been difficult to create images particularly for infrared cameras, which have a wide dynamic range, for example ranging from −5° C. to 1100° C., and to maintain a very good sensitivity across the whole temperature range, and particularly for the lower signal levels.

It is a well known disadvantage in relation to pure IR images that the users often have some difficulty to interpret the view that is shown. IR images are often more blurred than visual images because the wavelength region from the illustrated scene is different and the transitions between different temperatures are rather smooth. It is to be noted that an IR image is essentially based on different intensity of the shown objects within practically the same wavelength region, and the image is thus not very dependent on the wavelength, unlike images based on the visible wavelength region. Higher temperature at an object gives in principle a higher intensity. The different shades of intensity are given in a chosen colour scale, for example a high intensity is shown in red and a low brightness is shown in blue or violet.

A problem to solve is to make temperatures in a wide dynamic temperature range clear, distinct, and with good resolution even for the lower signal levels.

The invention has been particularly developed for use in IR cameras. However, it could also be used in any other kind of imaging device. One example of such a device is in infrared imagers for fire fighters. In such an imager a line scanning is made from an air borne vehicle flying over the object, which can be a forest. A demand on such systems is that they shall be able to present images with good resolution and accuracy both for room temperature and high temperature scenes simultaneously.

DESCRIPTION OF RELATED ART

U.S. Pat. No. 5,249,241 describes a histogram projection system, which automatically optimises tracks changes in luminance and adjusts in real time the display of wide dynamic range imagery from IR-cameras. The technique described in this document assigns display dynamic range equally to each occupied intensity level in the raw data. Thus a histogram projection system automatically tracks changes in luminance to adjust the display of wide dynamic range IR-imagery.

THE INVENTION

An object of the invention is to provide a method and an apparatus for providing an IR image, which presents a view, in which the temperature differences are presented with good resolution all through a huge temperature range.

Another object of the invention is to provide a method and an apparatus for presenting images with good resolution and accuracy both for room temperature and high temperature scenes simultaneously.

The objects mentioned above are solved with a method having the features disclosed in the characterising part of claim 1. Further developments and features and an apparatus to provide the method are apparent from the rest of the claims.

The invention relies on the fact that a time multiplexing and sequencing procedure acquires a sequence of images from a linear or matrix array of radiation sensitive detector elements. This matrix array could be a Focal Plane Array (FPA), having radiation sensitive detector elements, for example IR sensitive elements. The detector elements could be Micro-bolometers.

Advantages

The invention makes it possible to present images with good resolution and accuracy by creating an image that is a mixture of at least two images taken with different integration (exposure) times. The invention takes advantage on the fact that an Infrared Camera is radio-metrically calibrated and temperature stabilised, and also that one can create an Image Pixel Stream with calibrated pixels. It is to be noted that the present invention could not be implement in a non-calibrated IR camera.

BRIEF DESCRIPTION OF THE DRAWINGS

For a more complete understanding of the present invention and for further objects and advantages thereof, reference is now made to the following description of examples of embodiments thereof—as shown in the accompanying drawings, in which.

DETAILED DESCRIPTION OF PREFERRED EMBODIMENTS

Figure 1:
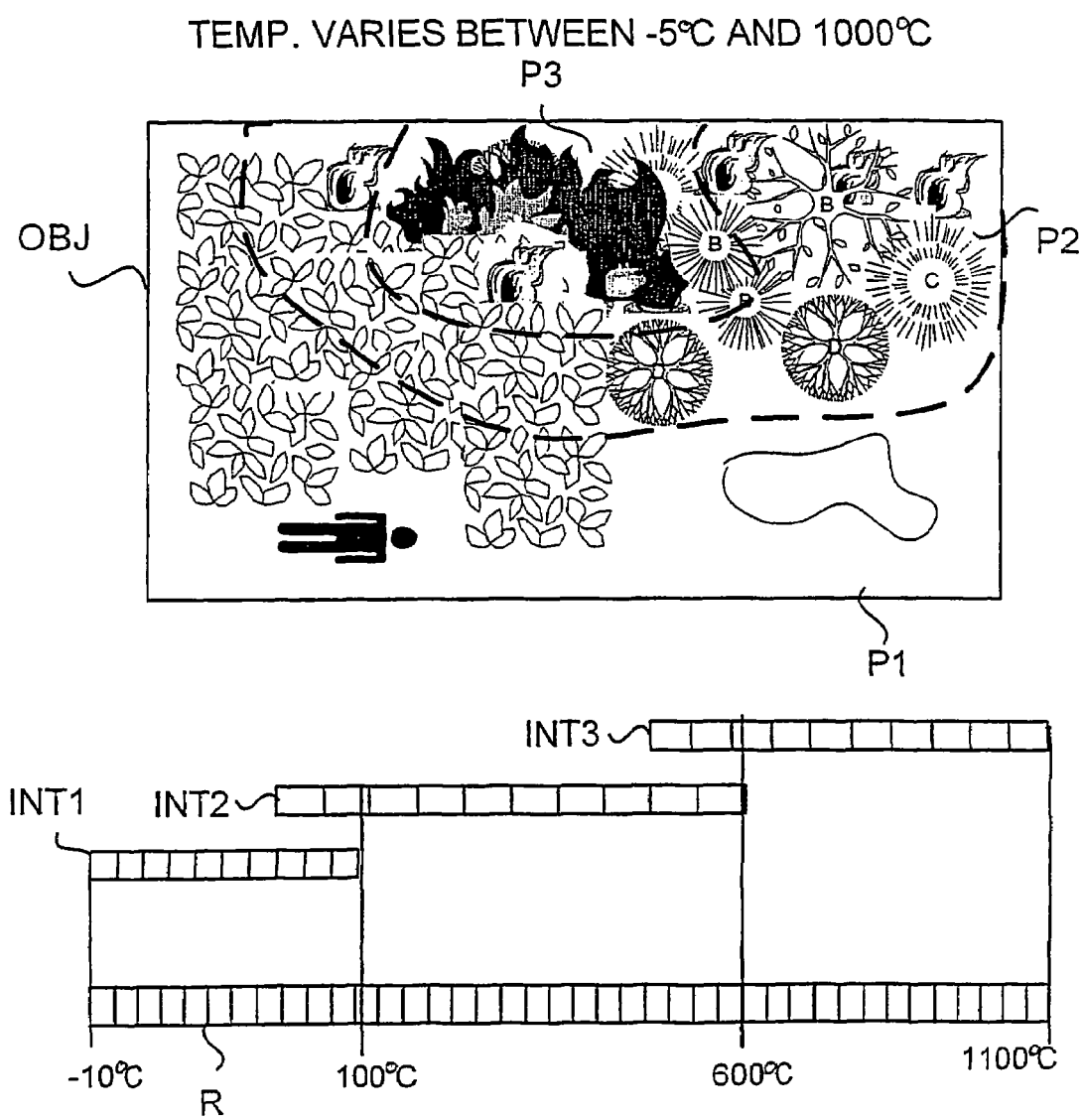
FIG. 1 illustrates the principle for a multi-range measurement.

Referring to FIG. 1, if the temperature range to be monitored for an object OBJ is very wide, for example ranges from ca −10° C. to ca 1100°, an IR image from only one image taken on the object will have a good sensitivity only for signal levels obtained for the higher parts of the temperature range. However, it is often important to have a good resolution also for signal levels from the lower part of the range.

According to the invention the wide temperature range is divided into at least two temperature intervals, three intervals are illustrated in FIG. 1. An image providing means, for example an IR camera, is provided, which takes a succession of images, each related to an individual one of the temperature intervals. As apparent from FIG. 1 showing an image of an area, in which a forest fire has started, the area to be observed has a temperature varying between ca −5° C. and ca 1100° C. The variation is illustrated to be included in three main areas, P1, having an area with a temperature between −5° C. and 150° C., comprising an icy lake, copse, and a human body, P2, comprising areas with a temperature between 100° C. and 600° C., comprising sparse flames and heated soil, and P3, with a temperature between 500° C. and 1000° C., comprising burning and flaming trees and ground cover.

A camera circuitry or an acquisition board reconstructs a single frame, shown in the upper part of FIG. 1, from the successive frames. The frames have preferably been cut such that no overlapping between them exist before the reconstruction. There are at least two frames. More than three demands a long time, if the different images are taken successively. This can be too long if the camera should be tolerably fast. Most often there is a demand to build up the successive frames in the same rate as the ordinary video frequency. The object is not allowed to move or change its temperature fast between the image recordings. However, the scope of the invention is not limited to use of a particular numbers of image recordings. However, as will be stated later on there is a possibility to provide a fast camera based on use of a number of FPAs.

In the embodiment shown in FIG. 1, an example of a full range from −10° C. to 1100° C. is given, where a number of different integration times have been determined. Three different images are then available with three different temperature intervals, the first one INT1 from −10° C. to 100° C., the second one INT2 from 90° C. to 600° C., and the third one INT3 from 500° C. to 1100° C. These three temperature intervals are only mentioned as exemplary and illustrated under the object OBJ. This will give three images with different useful areas, basically corresponding with each individual of the parts P1, P2, P3.

In the lower part of FIG. 1 the three intervals are illustrated in relation to the wide temperature range R ranging from −10° C. to 1100° C. and to illustrate the interface between the different temperature intervals when they are shown in a common display. The different temperature intervals are preferably provided with an individual colour scale each in order to distinguish the temperature interval from each other.

The goal is then to reconstruct from the consecutive frames a composed image comprising only a "useful" frame, which has the full dynamic range from −10° C. to 1100° C. The frame speed is adjusted with the number of successive frames with different integration times such that the "useful" frame has a constant frame rate, for example 50 Hz (20 ms). Thus, preferably, the intention is to produce each useful frame in real time without any processing later on.

Figure 2:
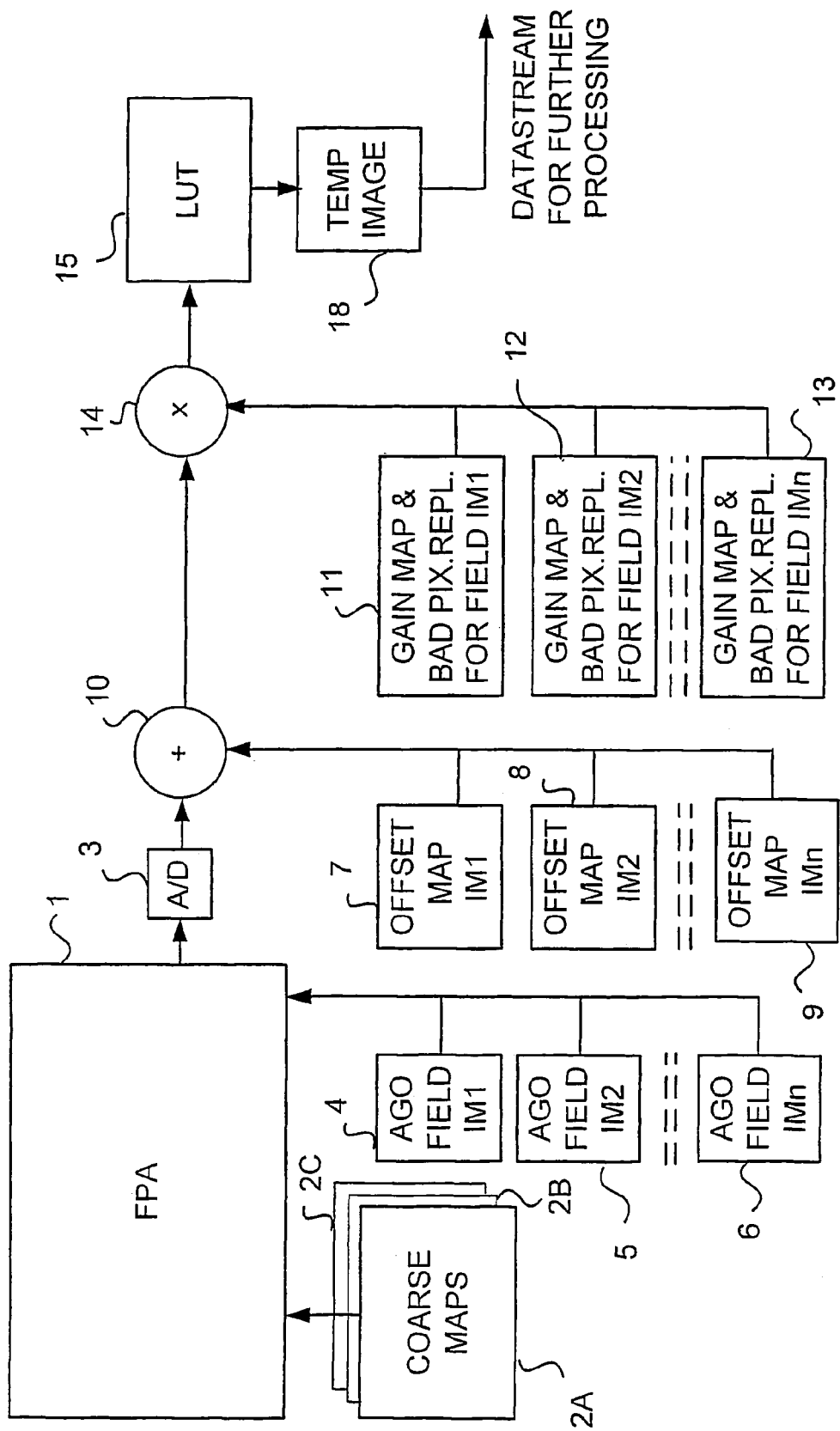
FIG. 2 shows a block schedule of a multi-range solution according to a first embodiment of the invention.

Referring to FIG. 2, a linear or matrix array 1 of radiation sensitive detector elements, such as a focal plane array (FPA) preferably comprising micro-bolometers. However, other kinds of radiation sensitive detector elements could be used as-well. As common for IR cameras using FPA it is radio-metrically calibrated and temperature stabilised.

Several images IM1, IM2, . . . IMn, representing interval representations since they represent intensive intervals, are to be taken in this embodiment for different temperature regions, i.e. the wide temperature range to be dynamically presented in an image is divided into an appropriate number of minor temperature intervals. These minor temperature intervals could preferably be chosen to be alike, but they could also be chosen such that the lowest temperature interval is the smallest and that the rest of the minor temperature intervals embrace larger and larger temperature regions. It is to be noted that other kinds of intensive intervals could be embraced by the inventive idea, such as intensive changes within the visible wavelength region.

For example, the successive temperature intervals could have increased intervals along an exponential scale. It is to be noted that the different images for the different temperature regions are recorded in mutually different integration times, the longer the warmer region. These different integration times must be compensated for when building up the useful frame.

Coarse maps 2A to 2n, one for each temperature region, for example each having 240*320 values, provide values used for coarse offsetting of the individual pixel values for each successive recording of the FPA 1 before the sensed values of the FPA are analogue-to-digital converted in an A/D converter 3. It is to be noted that the A/D converter need not be a separate element as illustrated. It could be incorporated in the FPA itself.

Analogue Global Offset (AGO) fields 4, 5, 6, one for each image to be taken, each representing an individual temperature region, are connected to the FPA 1 in order to impose AGO values on each pixel signal for an image just being recorded. This is also provided before the values from the FPA 1 are analogue-digital converted.

There is a set of acquisition and calibration parameters provided for each image IM1, IM2, . . . IMn.

At least as many Offset map fields 7, 8, 9 of digital values as there are images taken are used to individually offset each pixel value in each image separately. In the Offset map arrays shown in the embodiment of FIG. 2 each pixel value will be compensated for the Camera Internal Temperature Drift (CITD).

The digital values from the FPA, via the A/D converter 3, and the values from the Offset map fields 7, 8, 9 are summarised for each image IM1, IM2, . . . IMn separately in a summarising means 10. In this way each pixel in each image is offset compensated including offset drift due to CITD.

One Gain map & bad pixel replacement array 11, 12, 13 per image IM1, IM2, . . . IMn is provided for individually gain compensate each pixel value. Each value in each of these arrays is adjusted for the camera internal gain drift due to camera temperature variations.

A multiplier 14 makes a multiplication image by image with the Gain map & bad pixel replacement array 11, 12, 13. In this way each pixel is gain compensated including gain drift due to the CITD.

Thus, as by the measures discussed above, the acquisition parameters, which are a set of scalar and matrix variables, will be used to control and correct the acquired image. As an example, this could be Offset and Gain correction maps used in an IR camera. The calibration parameters is a set of variables obtained during a calibration procedure when the camera is manufactured and imposed on each image IM1, IM2, . . . IMn. Due to this calibration procedure each image IM1, IM2, . . . IMn will be mapped into an object temperature range, i.e. the image IM1 will have a temperature range Ta to Tb, the image IM2 a temperature range Tb to Tc, . . . , and the image IMn a temperature range Tn−1 to Tn. Ta<Tb<Tc<<Tn−1<Tn.

Thus, there will be a successive stream of images taken on the same object. A new, combined image, below called Display Image, could thereafter be built. Pixel values in the Display Image are thus taken from the successive images combined with each other in a selection procedure, of which an embodiment is described below.

Selection Procedure

Pixel values related to temperatures Ta to Tb are chosen from the image IM1, pixel values related to temperatures Tb to Tc are chosen from the image IM2, etc. Naturally the amount of images are depending upon how many different types of images and temperature intervals one wants to map into the Display Image. It is to be noted that it could be possible to change the temperature interval for each image and thus have more or less images for different kinds of applications for the camera.

This selection procedure can be implemented by using either one Look Up Table (LUT), which is updated synchronously to the time multiplexed behaviour of the image acquisition, or a set of LUTs, one for each image IM1, IM2, . . . IMn. The LUT or LUTs are used to linearly or non-linearly map pixels in the separate images IM1, IM2, . . . IMn into the Display Image in accordance with the selection procedure.

The embodiment shown in FIG. 2 comprises one LUT 15 used for the presentation. The LUT need not normally be temperature compensated. Depending upon what integration interval the LUT 15 is to be working in it comprises a different transmission function to transmit the signal into the display after being buffered in a temperature image storage 18.

The outputs from each LUT are thus combined in the digital temperature image storage 18, which preferably provides an 8-bit temperature image with as many ranges as there are images taken. Each image is for example 240*320 pixels. The digitised output from the storage 18 is then sent as a data stream for further processing, for example in a video digital/analogue converter, and from there to be shown on a display (not shown) to show the combined Display Image.

The LUT is updated as a part of a temperature compensation. Thus, the LUT need adjustment as a function of what temperature region it actually is working on.

Functional Description of LUT (Look up Table)

For simplicity reasons, the description below will be given for a two range solution.
Y=Display memory depth
For two range LUTs two temperature intervals will be mapped into one image. Then, three object temperatures are needed, where at least the middle temperature is common for the two temperature intervals. It is to be noted that the chosen temperature intervals could overlap each other to some extend at the interface between them.

$$Ta_{OBJ} < Tb_{OBJ} < Tc_{OBJ}$$

where $Ta_{OBJ}$ and $Tc_{OBJ}$ are the lowest and the highest temperatures of the object to be monitored within the wide dynamic temperature range, and $Tc_{OBJ}$ is a middle temperature at the interface between the two temperature intervals that the wide temperature range is divided in.

A transfer function between pixel values and object temperature for the image IM1 acquisition and calibration parameters (temperature interval 1) is:

$$U_{PIX}=f_1(T_{OBJ}) \Rightarrow T_{OBJ}=f_1^{-1}(U_{PIX})$$

A transfer function between pixel values and object temperature for the image IM2 acquisition and calibration parameters (temperature interval 2) is:

$$U_{PIX}=f_2(T_{OBJ}) \Rightarrow T_{OBJ}=f_2^{-1}(U_{PIX})$$

The LUT for the temperature interval 1, LUT1, maps pixel values into the display memory in the following manner:

for $U_{PIX}=f_1(T_{OBJ}<Ta_{OBJ}) \Rightarrow LUT1pix=0$ for $U_{PIX}=f_1(Ta_{OBJ} \leq T_{OBJ}<Ta_{OBJ}) \Rightarrow LUT1pix=0$ to $X$ where X is a value between 0 and the depth of the display memory. For an 8-bit display memory X could be between 0 and 255.

for $U_{PIX}=f_1(Tb_{OBJ} \leq T_{OBJ}) \Rightarrow LUT1pix=0$

Thus these pixels will be over read by LUT2.

The LUT for the temperature interval 2, LUT2, maps pixel values into the display memory in the following manner:

for $U_{PIX}=f_2(T_{OBJ}<Tb_{OBJ}) \Rightarrow LUT2pix=0$

These pixels will be over read by LUT1 for $U_{PIX}=f_2(Tb_{OBJ} \leq T_{OBJ}<Tc_{OBJ}) \Rightarrow LUT2pix=X$ to $Y$ where X is a value between 0 and the depth of the display memory. For an 8-bit display memory X could be between 0 and 255 and Y=255.

for $U_{PIX}=f_2(Tc_{OBJ} \leq T_{OBJ}) \Rightarrow LUT2pix=Y$ or $0$

Figure 3:
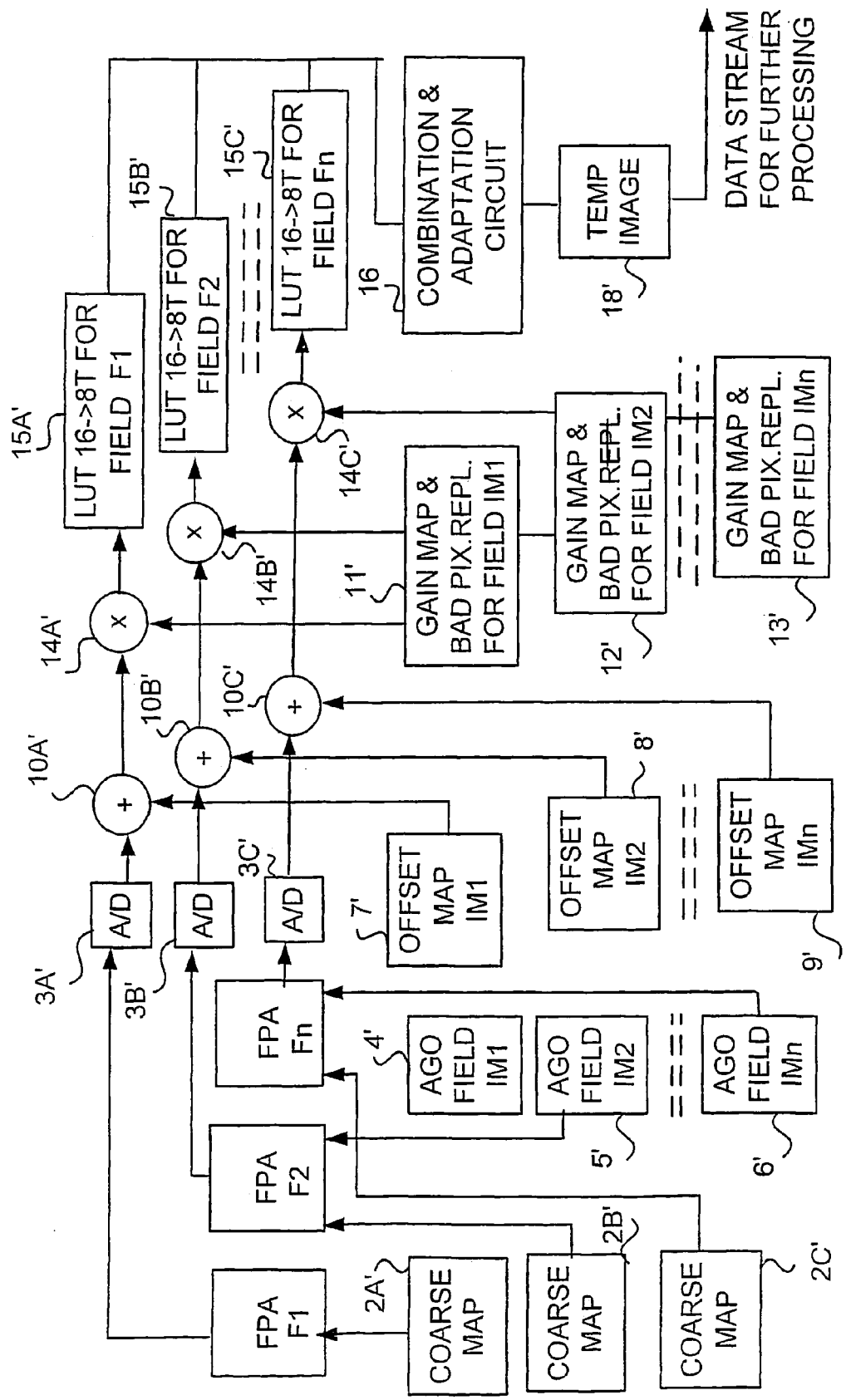
FIG. 3 shows a block schedule of a multi-range solution according to a second embodiment of the invention.

However, in order to provide a fast camera it is possible to provide a number of focal plane arrays (FPAs), or other kind or recording features, one for each temperature interval, instead of only one FPA. An embodiment illustrating this feature is shown in FIG. 3. In this embodiment each FPA F1 to Fn has a circuitry of its own up to a LUT of its own. The difference between this embodiment and the embodiment shown in FIG. 2 is that the processing procedure of the recorded images is parallel in FIG. 3 and successive in FIG. 2. The different blocks shown in FIG. 3 having the same tasks as the ones shown in FIG. 2 are provided with the same references except for an "'". The separate summarising means for the three images have the references 10A', 10B', and 10C', respectively. The separate multiplier means for the three images have the references 14A', 14B', and 14C', respectively.

The embodiment shown in FIG. 3 there is one LUT 15A', 15B', and 15C' for each image F1, F2, . . . Fn. The frame speed of the LUTs 15A', 15B', 15C' are adjusted in a combination and adaptation circuit 16 to provide the full representation, i.e. the temp image, with the number of successive interval representations, i.e. fields, having different integration times for the different interval representations, such that the display rate for the combined interval representations has a predetermined frame rate.

Thereafter, the images are provided as a combined and adapted temperature image information in a digital temperature image storage 18', which preferably provides an 8 bit temperature image with as many ranges as there are images taken. Each image from the LUTs is for example 240*320 pixels.

The digitised output from the storage 18' is then sent to a video digital/analogue converter and from there to be shown on a display (not shown) to show the combined Display Image. The sensitivity will be at least slightly different for the three sensor-groups (FPAs and line elements). A compensation must be provided. Then the sensitivity of the image as a whole will be inferior that of an image recorded successively on the same sensor group. This depends upon that the bandwidth is increased and it is related to the sensitivity.

Figure 4:
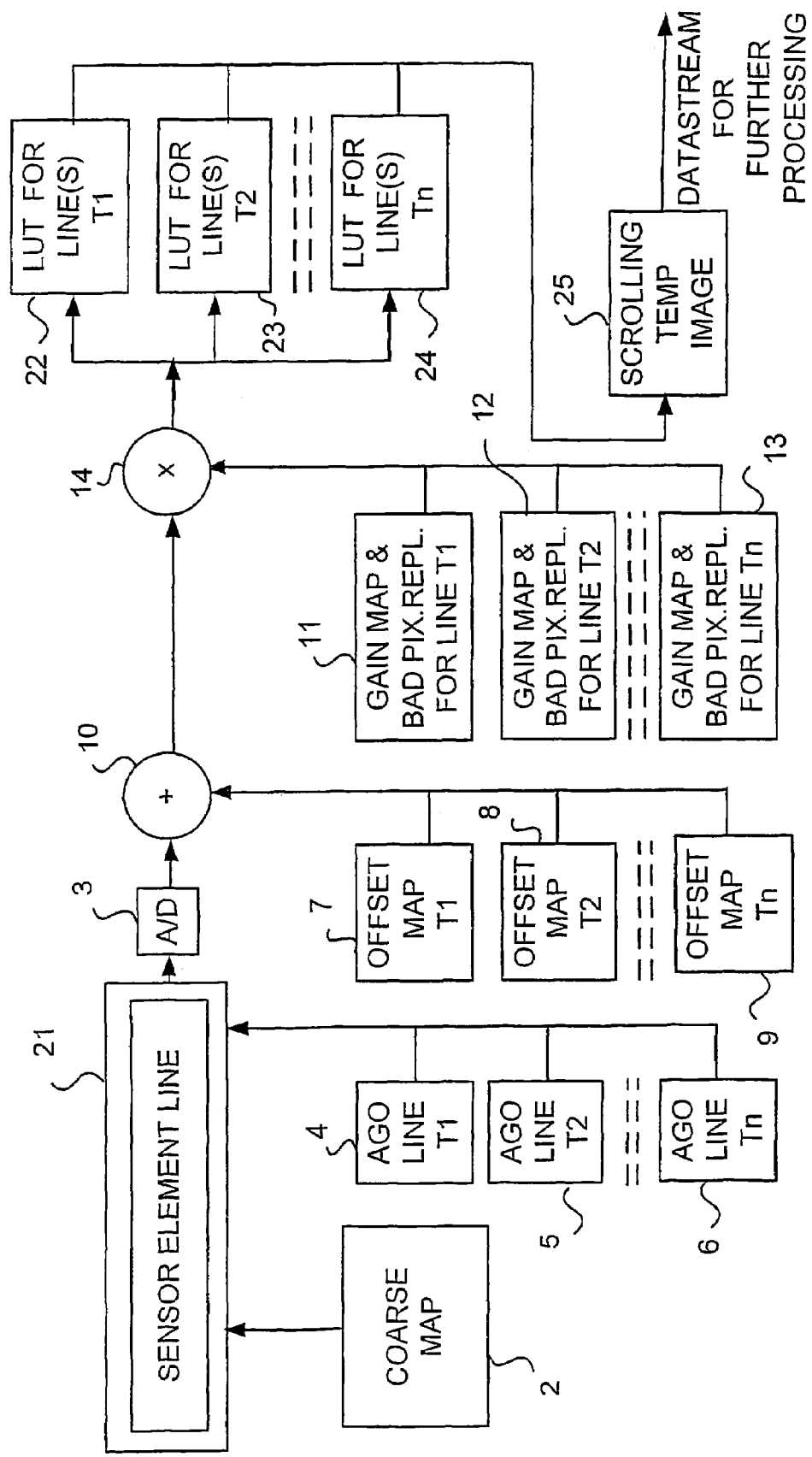
FIG. 4 shows a block schedule of a multi-range solution according to a third embodiment of the invention

Referring to FIG. 4, for an imager, which comprises a linear sensor element array, there could be one line, or a few parallel lines, of sensor elements for each temperature region, and they could be successively imagined, at the line recordings, such as in the embodiment shown in FIG. 2. The same kind of elements as in FIG. 2 could be used and have thus the same references, even though they have a diminished size compared to those shown in FIG. 2. However, the "image" for each recording is only one line, or a few lines, high, which means that it is possible to have more successive recordings for the same display line or lines, since they take shorter time. In this embodiment one LUT 22, 23, and 24 is provided for each line T1, T2, and Tn, respectively. The display image 25 is then built up line by line in a scrolling manner.

This embodiment could for example be used when flying over an area, in which a forest fire is to be monitored, such as the one shown in FIG. 1, or in process monitoring to make a thermal map of electrolytic tanks to show short circuits, defective electrolyte flows, hot current rails and/or missing anodes. Here an imager could be transported over an area comprising the electrolytic tanks.

Even in such a multi-line sensor device the lines are to be combined into one to be presented on a single Display in a scrolling procedure. It is also possible to provide a system of parallel recordings of line representations like the way illustrated in FIG. 3.

Although the invention is described with respect to exemplary embodiments it should be understood that modifications can be made without departing from the scope thereof. Accordingly, the invention should not be considered to be limited to the described embodiments, but defined only by the following claims, which are intended to embrace all equivalents thereof.

I claim:

1. A method to provide a full representation of an object having a wide dynamic intensive range and maintain a good sensitivity for signal levels throughout the whole intensive range, characterized by the following steps:
   a) divide the wide intensive range into a predetermined number of intensive intervals(INT1 to INT3) inside the wide intensive range, which intensive intervals are provided at the side of each other or are partly overlapping;
   b) providing the same number of interval representations (IM1 to IMn; F1 to Fn; T1 to Tn) of the object as the predetermined number of intervals, each interval representation being adapted to one individual of the intervals;
   c) adapting the sizes, acquisition parameters or calibration parameters of the interval representations(IM1 to IMn; F1 to Fn; T1 to Tn) to each other;
   d) combining the interval representations such that their respective intervals are provided in the same full representation (18;18'; 20),
   e) providing the interval representations for the predetermined number of intervals successively; and
   f) adjusting (18; 25) the frame speed of the full representation with the number of successive interval representations in a cycle with different integration times for the successive interval representations, such that the display rate for the combined interval representations has a predetermined frame rate.

2. A method according to claim 1, characterized by providing the predetermined intervals to be non-overlapping before combining the interval representations into the full representation.

3. A method according to claim 1, characterized by adjusting (16,18') the frame speed of the full representation with a number of parallel recorded interval representations for a full representation with different integration times for the individual interval representations, such that the display rate for the combined interval representations has a predetermined frame rate.

4. A method according to claim 1 for providing infrared images, characterized by making aradiometric calibration of each recorded interval representation before combining of a cycle of interval representations.

5. A method according to claim 4, characterized by creating for each interval representation a pixel stream having calibrated pixels.

6. A method according to claim 1, characterized by temperature stabilisation of each recorded interval representation before combining a cycle of interval representation.

7. A method according to claim 1, characterized by providing the interval representations by means of a linear or matrix array of radiation sensitive detector elements.

8. A method according to claim 1, characterized by providing a Look Up Table (LUT) common for all the interval representations in a cycle; updating the Look Up Table synchronously to a time multiplexed behaviour of the interval representation acquisition.

9. A method according to claim 1, characterized by providing a set of Look Up Tables (LUT), one for each interval representation in a cycle.

10. A device for an intensive full representation creating means for providing representations within a wide intensive range, comprising at least one linear or matrix array of radiation sensitive detectors for recording interval representations, characterized by
    means (1; F1 to Fn; 21) for recording a predetermined interval representation, each recorded for an individual intensive interval within the wide intensive range;
    means (7 to 15; 7' to 15A', 15B', 15C'; 7 to 24) for discriminating the intensive intervals such that the individual intensities for the individual interval representations will lie at the side of each other;
    combination means (18; 16,18'; 25) for combining the individual interval representations to a common full representation;
    successive means (2 to 15; 2 to 24) providing the interval representations for the predetermined number of intervals successively in a cyclic way; and
    combination and adaptation means (18; 25) for the frame speed of the full representation with a number of successive interval representations in a cycle with different integration times for the successive interval representations, such that the display rate for the combined interval representations has a predetermined frame rate.

11. A device according to claim 10, characterized by combination, and adaptation means (16,18') the frame speed of the full representation with a number of parallel recorded interval representations for a full representation with different integration times for the individual interval representations, such that the display rate for the combined interval representations has a predetermined frame rate.

12. A device according to claim 10 for providing infrared lines or images, characterized by radiometric calibration means comprised in the means (1; F1 to Fn; 21) for recording a predetermined interval representation.

13. A device according to claim 12, characterized by gain compensation means(11, 12,13; 11', 12', 13') for creating for each interval representation a pixel stream having calibrated pixels.

14. A device according to claim 10, characterized by temperature stabilisation means (7,8,9; 7',8', 9) of each recorded interval representation before combining a cycle of interval representation.

15. A device according to claim 10, characterized by a linear or matrix array of radiation sensitive detector elements, for example comprising Focal Plane Arrays(FPAs) of Micro-bolometers, for recording the interval representations.

16. A device according to claim 10, characterized by a Look Up Table (LUT) common for all the interval representations in a cycle updated synchronously to a time multiplexed behaviour of the interval representation acquisition.

17. A device according to claim 10, characterized by a set of Look Up Tables (LUT), one for each interval representation in a cycle.

* * * * *